(12) United States Patent
Lillienskjold (10) Patent No.: US 10,080,436 B2
(45) Date of Patent: Sep. 25, 2018

(54) LEVELLING DEVICE WITH FROM ABOVE MOUNTED SLEEVE AND USE

(71) Applicant: NGI A/S, Nørresundby (DK)

(72) Inventor: Lars Von Lillienskjold, Hjørring (DK)

(73) Assignee: NGI A/S (DK)

( * ) Notice: Subject to any disclaimer, the term of this patent is extended or adjusted under 35 U.S.C. 154(b) by 0 days.

(21) Appl. No.: 15/317,653

(22) PCT Filed: May 6, 2015

(86) PCT No.: PCT/DK2015/050117
§ 371 (c)(1),
(2) Date: Dec. 9, 2016

(87) PCT Pub. No.: WO2015/192849
PCT Pub. Date: Dec. 23, 2015

(65) Prior Publication Data
US 2017/0119154 A1   May 4, 2017

(30) Foreign Application Priority Data

Jun. 17, 2014 (DK) .................................. 2014 00317

(51) Int. Cl.
*A47B 91/02* (2006.01)
*F16M 11/26* (2006.01)
(52) U.S. Cl.
CPC ........... *A47B 91/024* (2013.01); *F16M 11/26* (2013.01); *A47B 91/022* (2013.01); *F16M 2200/08* (2013.01)

(58) Field of Classification Search
USPC ..................... 248/677, 188.2, 188.4, 188.8
See application file for complete search history.

(56) References Cited

U.S. PATENT DOCUMENTS

| | | | |
|---|---|---|---|
| 2,592,942 A | 4/1952 | Moore | |
| 3,868,079 A * | 2/1975 | Johnson ............... | A47B 91/024 248/188.4 |
| 4,479,627 A * | 10/1984 | Wehner .................. | A47C 3/245 248/406.2 |
| 5,881,979 A * | 3/1999 | Rozier, Jr. ............... | F16M 7/00 248/188.4 |
| 6,027,086 A * | 2/2000 | Heitlinger ............ | A47B 91/024 248/188.5 |
| 7,588,386 B2 * | 9/2009 | Kielczewski ......... | F16B 5/0233 248/188.4 |

(Continued)

FOREIGN PATENT DOCUMENTS

DK        176705        3/2009

*Primary Examiner* — Alfred J Wujciak
(74) *Attorney, Agent, or Firm* — Ware, Fressola, Maguire & Barber LLP (57) ABSTRACT

The present invention is directed to a levelling device, which includes a top part and a lower part, where there in the top part is included a spindle, which includes a thread and an external cylindrical surface, a stop item and a sleeve, which includes at least one internal stop surface and that the spindle includes at least one track in which the stop item is placed. With the invention it is achieved that it is possible to manufacture a levelling device, where the sleeve, as a result of the stop surface on the sleeve and the stop item, which is mounted in the track on the spindle cannot be screwed so high up that parts of the thread on the spindle are exposed.

15 Claims, 5 Drawing Sheets

(56) References Cited

U.S. PATENT DOCUMENTS

| | | | | |
|---|---|---|---|---|
| 7,780,128 B2* | 8/2010 | Walsberg | ............ | A47B 91/024 |
| | | | | 248/188.2 |
| 8,002,224 B2* | 8/2011 | Hamann | ............... | A47B 91/026 |
| | | | | 248/188.4 |
| 8,141,841 B2* | 3/2012 | von Lillienskjold | ... | F16F 1/445 |
| | | | | 248/188.8 |
| 2006/0102815 A1* | 5/2006 | Erdmann | ............ | A47L 15/4253 |
| | | | | 248/188.2 |
| 2009/0278003 A1* | 11/2009 | Chiang | ................ | A47B 91/026 |
| | | | | 248/188.4 |
| 2010/0237205 A1* | 9/2010 | Hirsh | .................... | A47B 91/16 |
| | | | | 248/188.4 |
| 2011/0198458 A1* | 8/2011 | Karl | .................... | A47B 91/024 |
| | | | | 248/188.4 |
| 2013/0048805 A1* | 2/2013 | Haydu | ................ | A47B 91/028 |
| | | | | 248/188.4 |
| 2016/0032953 A1* | 2/2016 | Papadopoulos | ....... | E04G 25/065 |
| | | | | 248/188.4 |

* cited by examiner

LEVELLING DEVICE WITH FROM ABOVE MOUNTED SLEEVE AND USE

CROSS-REFERENCE TO RELATED APPLICATIONS

This application is a U.S. national stage of International Appl. No. PCT/DK2015/050117 filed 6 May 2015, which claimed priority to Danish Appl. No. PA 2014 00317 filed 17 Jun. 2014, which applications are all incorporated herein by reference in their entireties.

TECHNICAL FIELD

The invention relates to a levelling device for levelling and support of items, such as machines, which levelling device includes a top part for fastening in an item, such as a machine and a, from the top part separable lower part for contact against a base such as a floor and where there in the top part is included a spindle, which includes a thread, a lower end surface at the lower part, an external cylindrical surface in the area between the thread and the lower end surface and a center axis and a sleeve, which includes a first end surface closest to the lower part and another end surface in the opposite end of the sleeve and an internal thread in an area at the other end surface and designed to go in mesh with the thread on the spindle, and an internal cylindrical surface between the internal thread and the first end surface with a larger circumference than the external circumference on the spindle's thread.

The invention also relates to the use of the levelling device.

BACKGROUND

On existing levelling devices consisting of adjustable legs/machine feet for use in locations with high requirements for hygiene and with spindles below a certain diameter are today typically used a sleeve, which is mounted from above around the spindle, to shield the thread on the spindle. Sleeve in this connection technically describes a thread shielding.

The sleeve is mounted from above, since there lowermost on the spindle can be an area with a larger circumference than the outer circumference on the spindle's thread, which prevents that the sleeve can be mounted from below.

The thread on the spindle must be covered with a shielding, since cleaning a thread with small edges and sharp corners is very difficult. It is also a requirement that the thread on the spindle is shielded in connection with achieving authority approvals of a levelling device, including USDA, EHEDG and 3A approvals.

This sleeve seals with a lower sealing item lowermost towards the spindle below the spindle's thread and uppermost with an upper sealing item towards the underside of an item, which must be supported by the levelling device, such that filth and bacteria cannot enter into the thread on the spindle. It will be described in a mounting instruction that you may not screw the sleeve so high up that the lowermost part of the thread on the spindle becomes visible.

There are, however, certain drawbacks of the known technology, including that it is possible to screw the noise shielding so far up that the lowermost sealing item is led with the sleeve up over the thread on the spindle and the thread on the spindle is hereby partially exposed and filth and bacteria can enter into the thread and also up below the sleeve, since the lowermost sealing item can not seal against the thread itself on the spindle. This occurs despite it being described in the mounting instruction that the sleeve must not be screwed so high up.

It is furthermore expected that the authority approvals of the levelling device, including at USDA, will make demands concerning that neither the whole thread nor parts of the thread on the spindle can be exposed by a potential faulty use.

DK176705 includes an adjustable leg for levelling and support of items such as machines and as stated in the introduction. By the stated machine foot, there is a risk that the lower part of the thread on the spindle is exposed by mistake.

U.S. Pat. No. 2,592,942 shows a levelling device for levelling and support of items, which levelling device includes at top part suitable for fastening in an item, such as a machine and a lower part for contact against a base. Included in the construction is a spindle with a thread. Upper and lower sleeves are provided around the spindle, the lower sleeve being fastened to the spindle, the upper sleeve being fastened in the item.

SUMMARY OF THE INVENTION

It is therefore an object of the invention to show a levelling device without the above drawbacks or at least provide a useful alternative.

The object of the invention is achieved by a levelling device for levelling and support of an item, including a top part for fastening in the item and having a spindle and a sleeve mounted on the spindle, and a lower part separable from the top part for contact against a surface, wherein the spindle comprises a thread, a lower end surface, an external cylindrical surface in the area between the thread and the lower end surface, a center axis for the thread, the lower end surface and the sleeve, wherein the sleeve includes a first end surface closest to the lower part, an upper end surface on the opposite end of the sleeve and an internal thread in an area at the upper end surface and designed to engage with the thread on the spindle to control axial movement of the sleeve with respect to the spindle, wherein the sleeve further comprises an internal cylindrical surface between the internal thread and the first end surface having a larger circumference than the external circumference on the thread of the spindle and an internal stop surface positioned perpendicular relative to the center axis and positioned between the internal thread and the first end surface on the sleeve, wherein the internal stop surface extends radially inwardly from the internal cylindrical surface and is limited by an inner surface positioned between the external cylindrical surface of the spindle and the internal cylindrical surface on the sleeve, wherein the spindle further comprises a track which extends perpendicular to the center axis and is placed where the thread and the cylindrical surface on the spindle meet, wherein the top part further comprises a stop item mounted in the track on the spindle and extending outwardly over the inner surface to contact the internal stop surface of the sleeve, and wherein the stop surface is axially movable along the external cylindrical surface below the stop item by rotating the internal thread with respect to the thread as the sleeve is turned.

In this way, it thus becomes possible to manufacture a levelling device, where the sleeve can not be screwed so high up that the whole or parts of the lowermost of the spindle's thread is exposed. Furthermore, it can be ensured that there will always be thread at the top of the spindle for attaching in the item, which is to be supported. Levelling device, which with its other construction details can be used in locations with high hygiene requirements, can thus in the future also be approved by USDA, 3A and EHEDG if it is introduced as a requirement by the relevant authorities that the spindle's thread must not be exposed by screwing the sleeve too high up. By constructing stop surfaces as indicated on the sleeve and introducing a stop item that is mounted on the spindle in a track is provided an upper stop for the sleeve's movement and it is hereby ensured that the whole or parts of the thread on the spindle can not be exposed by a mistake.

By a levelling device should in this context be understood an adjustable element including an adjustable machine foot for supporting machines. The levelling device can also include an adjustable leg, which supports a machine.

The adjustment of the device results in that the, on the device resting, machine can be set level or in a desired angle dependent on the conditions.

Further preferred embodiments of the levelling device are stated herein.

By an additional aspect of the invention, the levelling device includes that the sleeve includes an insert part and a shielding part, which insert part includes an external, preferably conic surface, which is designed to form contact with an internal preferably conical surface on the shielding part and which insert part includes an end surface, which is designed to form contact with an internal preferably ring shaped surface on the shielding part, which shielding part includes external preferably cylindrical surfaces on the sleeve.

It is hereby achieved that the sleeve can be assembled to one unit around the stop item, which is mounted on the spindle.

By an additional aspect of the invention, the levelling device includes that the sleeve includes an insert part and a shielding part, which insert part and shielding part contain items for providing a mechanical locking between the insert part and the shielding part, which items include thread, glue line, weld or press fit joint.

It is hereby achieved that the insert part and the shielding part are mechanically locked to each other By an additional aspect of the invention, the levelling device includes that the insert part is manufactured from a metallic or polymeric material, including stainless steel or brass.

It is hereby achieved that the insert part has a sufficient strength and there can also be achieved friction related advantages by using another material than for the shielding part By an additional aspect of the invention, the levelling device includes that the shielding part is manufactured in a metallic or polymeric material, including stainless steel.

It is hereby achieved that the shielding part has a sufficient strength and physical properties to ensure a surface, which can be approved for locations with high requirements for hygiene.

By an additional aspect of the invention, the levelling device includes that the stop item is a locking ring.

It is hereby achieved that the stop item can be provided with a standard item

By an additional aspect of the invention, the levelling device includes that the track on the spindle proceeds all the way around the spindle. It is hereby achieved that the reaction forces from the stop item, when the stop surface on the sleeve hits the stop item, can be transferred to the spindle with minimal transverse forces.

By an additional aspect of the invention, the levelling device includes that the stop surface on the sleeve is provided by a ledge placed in the area where the first end surface on the sleeve is found.

It is hereby achieved that the stop surface can be placed so close to the first end surface on the sleeve as possible, in order to make the distance between this stop surface and the stop surface on the spindle, when the screwing on of the sleeve is initiated, become as large as possible, and thereby that the sleeve can be screwed so far up as possible.

By an additional aspect of the invention, the levelling device includes that the ledge is designed to support a lower sealing item, which lower sealing item is designed to seal between the sleeve and the spindle's cylindrical surface.

It is hereby achieved that the ledge can be used for two purposes, to support a sealing item and provide a stop surface, and thereby that you save material and thereby weight in the sleeve.

By an additional aspect of the invention, the levelling device includes that there in the area at the lower end surface on the spindle is found a surface with a larger circumference in a plane perpendicular to the spindle's center axis than the cylindrical surface on the spindle.

It is hereby achieved that the area on the lower end surface is large enough to be able to ensure sufficient support and sealing towards the lower part.

By an additional aspect of the invention, the levelling device includes that the stop item includes a stop surface, which stop surface is designed to be positioned fixed in relation to the spindle.

By an additional aspect of the invention, the levelling device includes that the stop surface includes the surface on the stop item, which faces in direction towards the lower surface, and which is not in mesh with the track.

As mentioned, the invention also relates to the use of the above mentioned levelling device in locations with high requirements for hygiene such as locations for processing of foodstuffs or manufacturing of medicine.

The invention also relates to use of the above mentioned levelling device for support of a machine placed in areas with risk of earthquake.

The invention will now be explained more fully with reference to the drawings, in which:

DETAILED DESCRIPTION OF THE INVENTION

Figure 1:
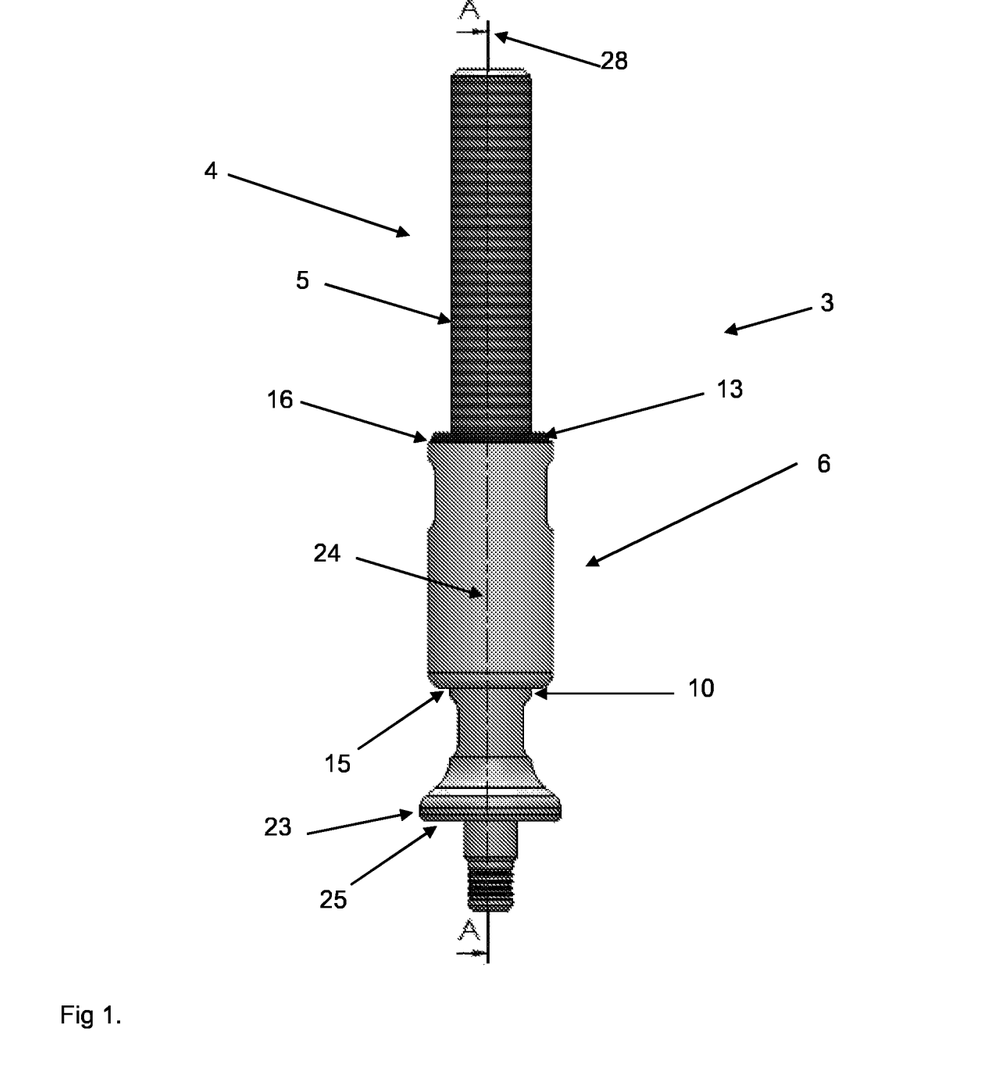
FIG. 1 shows an assembled top part according to the invention

In FIG. 1, with (3) indicated shown a top part, which includes a spindle (4), with a thread (5) on the upper part of the spindle (4) and a cylindrical surface (10) on the lowermost part of the spindle (4), the top part (3) furthermore includes a mostly cylindrical sleeve (6).

The thread (5) on the spindle has an outer circumference with the same value as the circumference of the spindle's (4) cylindrical surface (10). In other embodiments the outer circumference on the spindle's (4) thread (5) can be both smaller and larger than the circumference on the cylindrical surface (10)

With (15) therein indicated is a surface, which consists of a first end surface (15) on the sleeve (6). The first end surface (15) is in an assembled levelling device (1) placed closest to a lower part (2), which assembled levelling device (1) and lower part can be seen in FIG. 5. With (16) therein indicated is another surface, which consists of another end surface (16) on the sleeve (6) placed in the opposite end of the first end surface (15) on the sleeve (6).

With (13) therein indicated is an upper sealing item, which is mounted on the sleeve (6) at the sleeve's (6) other end surface (16). This upper sealing item (13) is designed to seal between the sleeve (6) and the supported item and thereby ensures that filth and bacteria can not enter into the spindle's (4) thread (5) in this area.

With (25) therein indicated is a lower end surface on the spindle (4), which lower end surface (25) in an assembled levelling device (1) is placed closest to the lower part (2).

Figure 2:
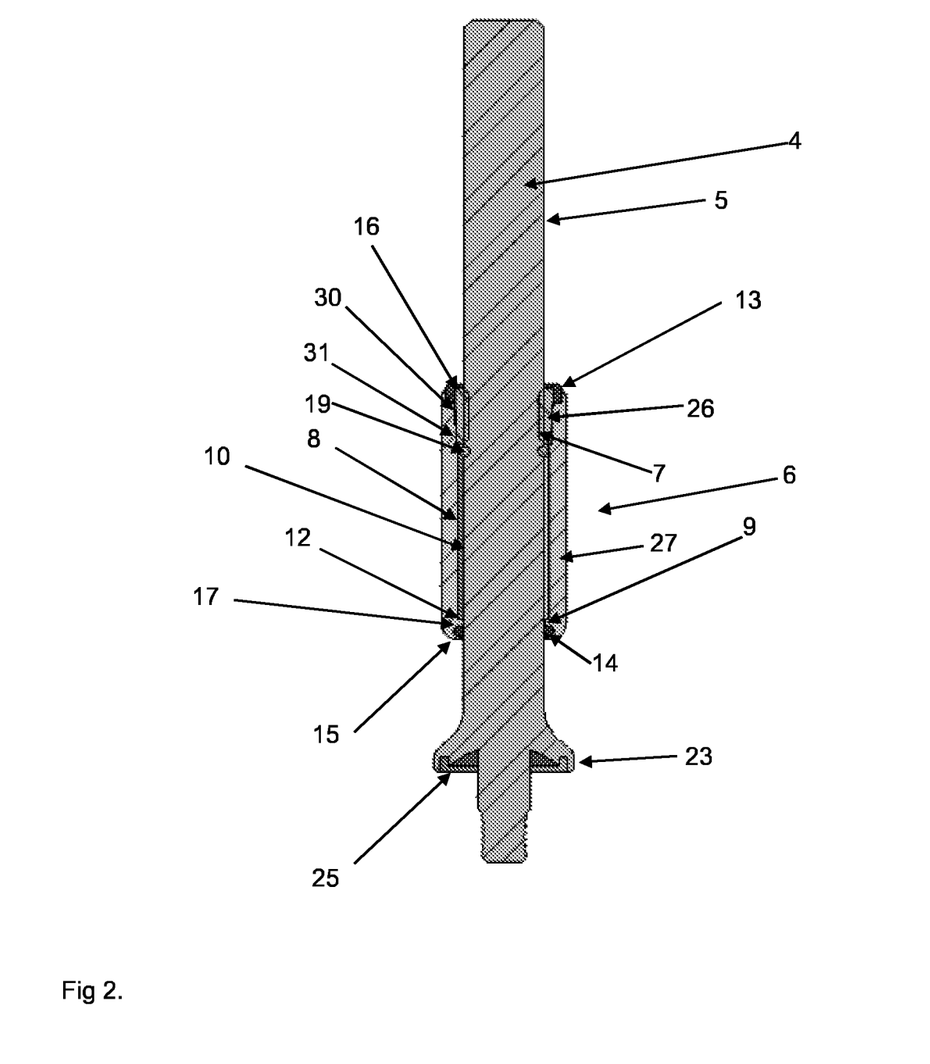
FIG. 2 shows a cut through the top part along the line A-A shown in FIG. 1

With (28) therein indicated is a sectional marking, where the sectional view image is shown in FIG. 2

With (24) therein indicated is a center axis in the spindle (4).

Figure 4:
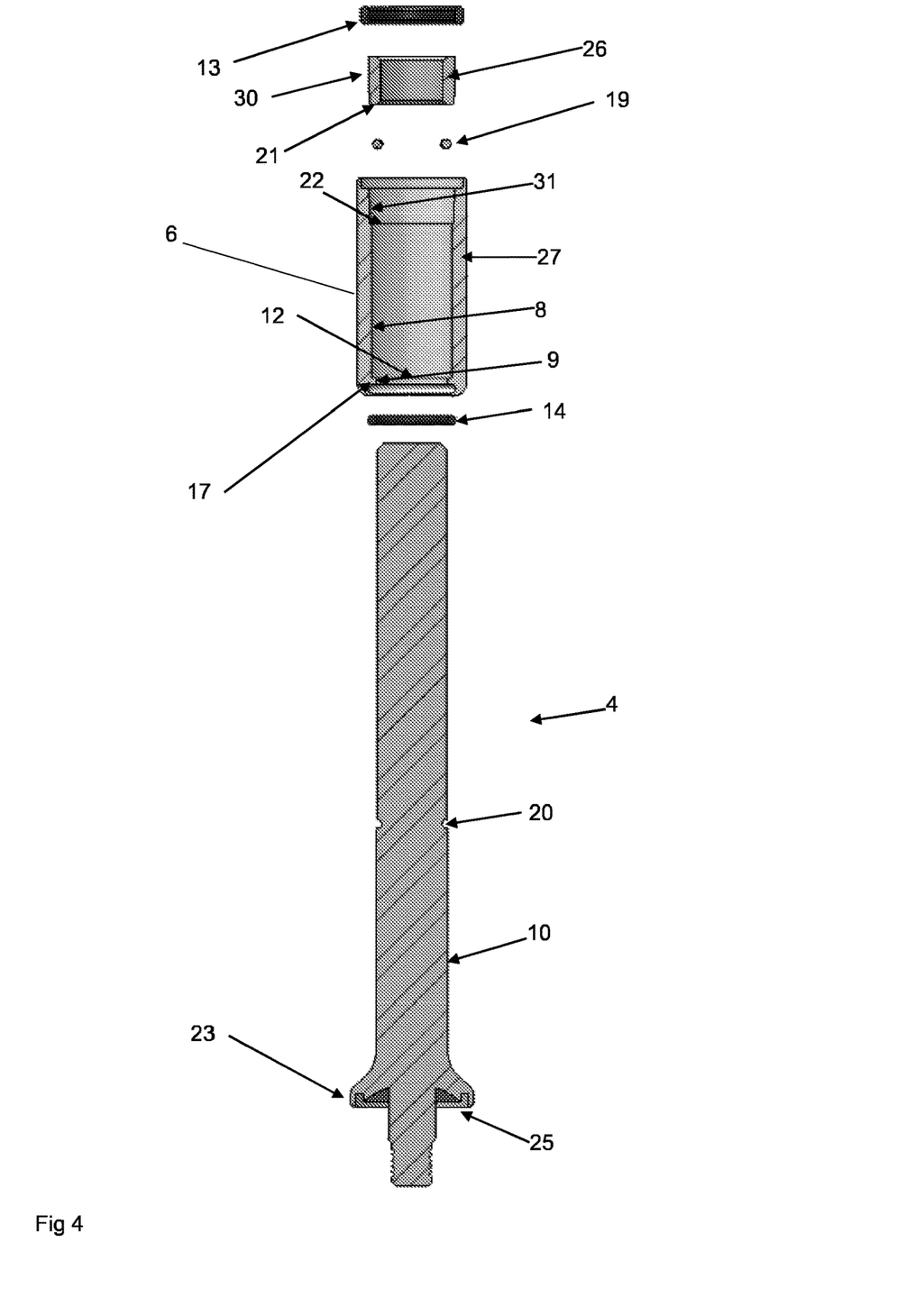
FIG. 4 shows a cut through the top part along the line B-B shown in FIG. 2

In FIGS. 2 and 4 (7) therein indicates an internal thread in the sleeve (6), which is designed to go in mesh with the thread (5) on the spindle (4). The thread (7) on the sleeve (6) is placed at the sleeve's (6) other end surface (16) and consists of a part of the internal geometry in the sleeve (6)

In FIGS. 1 to 4 (10) therein indicates a cylindrical surface on the spindle (4), which is placed in the area between the spindle's (4) thread (5) and lower end surface (25). In a preferred embodiment, the cylindrical surface (10) is smooth with which there is understood that the surface is without thread and suited for forming contact for a sealing item (14).

The circumference of this cylindrical surface (10) has the same value as the outer circumference on the spindle's (4) thread (5). In other embodiments, the outer circumference on the spindle's (4) thread (5) can be both smaller and larger than the circumference on this cylindrical surface (10). On the lower part of the cylindrical surface (10), there are two parallel plane surfaces on each side of the center axis (24). These surfaces are used for contact for a screw wrench such that it is possible to turn the spindle or to hold it fixed.

Figure 3:
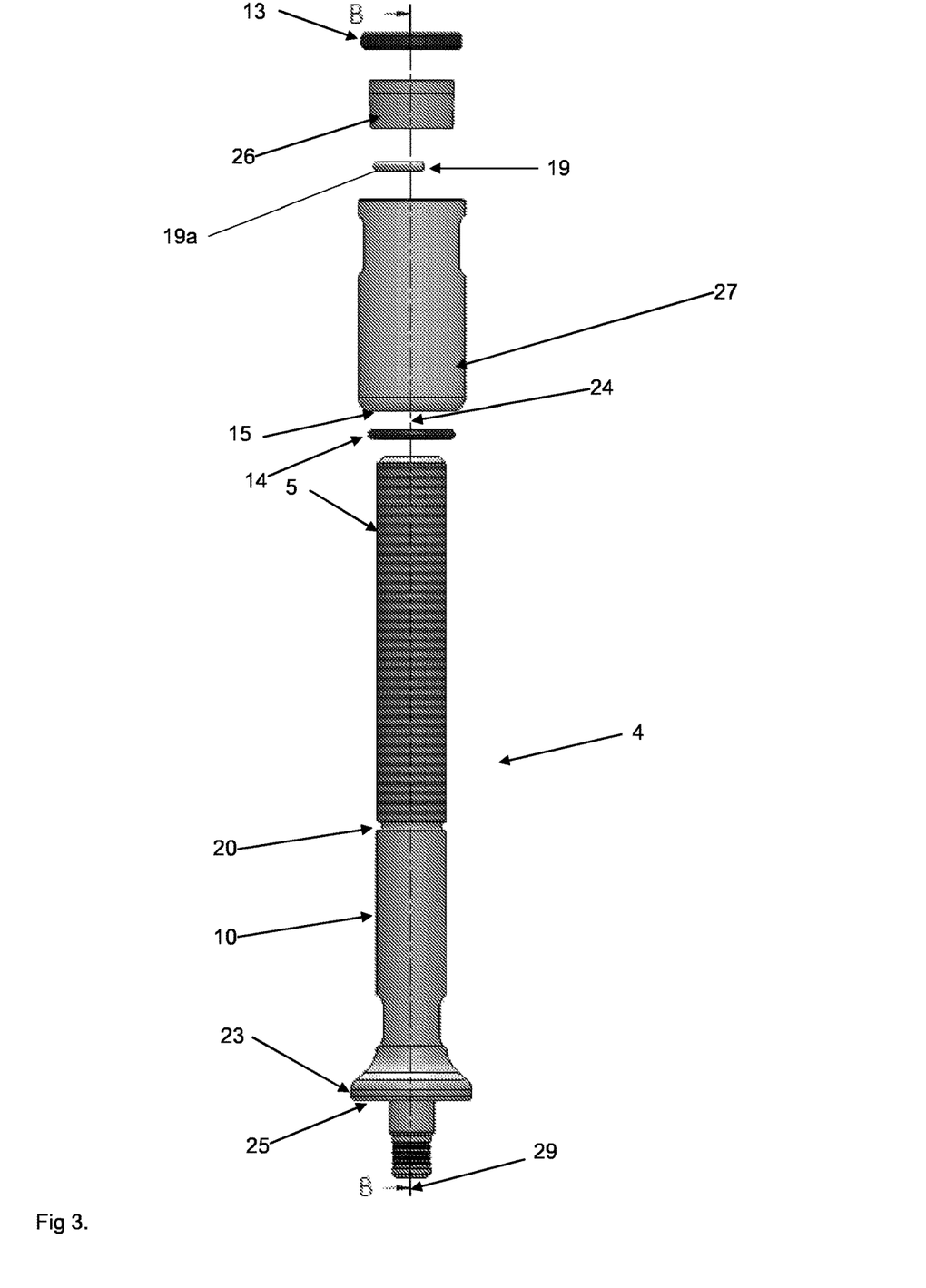
FIG. 3 shows an exploded top part according to the invention

In FIGS. 3 and 4 (20) therein indicates a track (20) in the cylindrical surface (10) on the spindle (4).

In a preferred embodiment, the track (20) has a rotation symmetrical shape in relation to the center axis (24) and is suited to fix a locking ring.

The track thus proceeds in a plane perpendicular to the center axis (24). The track (20) is not limited to this design shown here and can in another embodiment have other designs including being slanted in relation to the center axis (24) or be shaped as a hole through the spindle, designed to fix a peg or consists of several separate tracks.

In a preferred embodiment, the track (20) is placed where the thread (5) and the cylindrical surface (10) on the spindle (4) meet, but can also be placed further down in direction towards the lower end surface (25) on the spindle (4).

In FIGS. 2, 3 and 4 (19) therein indicates a stop item (19). The stop item's (19) function is to provide a stop surface (19a), which is positioned fixed in relation to the spindle (4). The stop item (19) mounted in the track (20) on the spindle (4) stretches itself past another surface (9) on the sleeve (6) such that there occurs a stop surface (19a) on the stop item (19), which stop surface 19a forms contact with the sleeve's (6) stop surface (12) when the sleeve (6) is screwed so far up as possible. This stop surface 19a on the stop item (19) will thereby prevent the sleeve (6) from being screwed so high up that the whole or parts of the spindle's (4) thread (5) is exposed. The stop surface (19a) of the stop item (19) may include a locking ring, which faces in direction (axial) towards the lower surface (25) and which in radial direction is not encased in the track (20).

The internal cylindrical surface (8), the other surface (9) and the stop surface (12) on the sleeve (6) are described in detail below.

In a preferred embodiment, the stop item (19) has an exemplary design as a locking ring, which is designed to be able to be pressed into the track (20) on the spindle (4) but is not limited to this design and can also have other designs, including being shaped as a peg, be u-shaped or consisting of several parts.

With (23) indicated is on the spindle (4) shown another surface in the area near the lower end surface (25) on the spindle (4) with a larger circumference than the cylindrical surface (10). This surface (23) is preferably cylindrical, but can in another embodiment have a non-cylindrical cross section in a plane perpendicular to the center axis (24), including polygonal, or it can be a conical surface.

The larger circumference of the surface (23) near the lower end surface (25) and thereby a larger area on the lower end surface (25) is necessary in order to provide sufficient support and sealing towards the lower part (2). The larger circumference of the surface (23) near the lower end surface (25) results in that it is not possible to mount the sleeve (6) from below. The ledge (17) on the sleeve (6) and the sealing item (14), which is mounted on the ledge (17) and is to form contact towards the cylindrical surface (10) on the spindle (4), can thus not go past this surface (23).

This larger circumference at the lower end surface (25) on the spindle thus entails that the sleeve (6) can not be mounted from below. It can apparently neither be mounted from above as an item, since the stop item (19) must be placed inside the sleeve (6) between the internal thread (7) and the stop surface (12) on the sleeve (6), which means that the stop surface (12) on the sleeve must be led past the area where the stop item (19) must be placed in direction towards the lower end surface (25) on the spindle (4), but must not be able to be led past the stop item (19) placed in the track (20) in direction away from the lower end surface (25) on the spindle (4).

In FIGS. 2, 3 and 4 (27) therein indicates a shielding part, which is a part of the sleeve (6).

With (26) indicated is shown an insert part, which is a part of the sleeve (6). The insert part (26) and the shielding part (27) are designed to go in mesh with each other, such that they consist of an assembled sleeve (6).

In a preferred embodiment, the two parts (26,27) are assembled by pressing the insert part (26) down in the shielding part (27).

In FIGS. 2 and 4 (30) therein indicates an external surface on the insert part (26) and with (31) indicated an internal surface on the shielding part (27). These two surfaces (30, 31) are designed to go in mesh with each other and form a press fit joint and by use of friction between the two surfaces (30,31) ensure that the insert part (26) and the shielding part (27) are fixed connected to each other.

In a preferred embodiment, the two surfaces (30,31) are conical with a cylindrical cross section in a plane perpendicular to the center axis (24) and designed to be pressed together, but they are not limited to this design and can thus also have other designs, including a polygonal cross section, be shaped as a thread, such that the insert part (26) can be screwed into the shielding part (27) and by application of a thread glue, the two parts (26,27) can be locked to each other, or the surfaces (30,31) can be designed for the insert part (26) can be glued together with the shielding part (27).

The insert part (26) is positioned in the center axis' (24) direction by there being a lower end surface (21) on the insert part (26), which is designed to form contact with an internal ring shaped surface (22) on the shielding part (27). By pressing the insert part (26), these two surfaces (21,22) will meet and the insert part (26) will be correctly placed in relation to the shielding part (27).

The lower end surface (21) on the insert part (26) and the ring shaped surface (22) on the shielding part (27) are here shown as perpendicular to the center axis (24) proceeding surfaces, but is not limited to this design and can in another embodiment have other shapes, including being conical.

In a preferred embodiment, the insert part (26) in the sleeve (6) is placed in the area at the upper end surface (16) on the sleeve (6) and has an internal thread (7), which is designed to be able to go in mesh with the spindle's (4) thread (5).

The insert part (26) is not limited to this placement and can in another embodiment be placed in the area near the lower end surface (15) on the sleeve (6). In this placement, the sleeve's (6) internal thread (7) will be placed on the shielding part (27) while the ledge (17), the stop surface (12) and support for the lower sealing item (14) are found on the insert part (26).

The here shown sleeve (6) is assembled, as mentioned, by pressing the insert part (26) into the shielding part (27). Firstly, the shielding part (27) is led down over the spindle's (4) thread (5) and past the track (20) in the spindle (4). Subsequently, the stop item (19) is mounted in the track (20). Subsequently, the insert part (26) is screwed on the spindle's (4) thread (5) and the shielding part (27) is led up to the insert part (26) and the two items (26,27) are pressed together and consist the sleeve (6) such that the stop item (19) is enclosed by the sleeve (6) and is placed between the internal thread (7) and the stop surface (12) on the sleeve (6).

In a preferred embodiment, the insert part (26) and the shielding part (27) are made from stainless steel, but they are not limited to these materials. The insert part (26) can thus in another embodiment be manufactured in other materials, including brass or a plastic material, which results in advantages in connection with the friction between the internal thread (7) on the insert part (26) and the spindle's (4) thread (5).

In a preferred embodiment, the insert part (26) consists of an item, but can also consist of several parts, including 2 half ring shaped parts, which are assembled around the spindle (4) and are together pressed in the shielding part (27).

In an alternative embodiment, the sleeve (6) can consist of only one part. In such an other embodiment, the track (20) on the spindle and the stop item (19) will be able to have another design than the one shown here, including the stop item (19) will have to allow that the stop surface (12) on the sleeve (6) can be led in direction towards the lower end surface (25) on the spindle (4) past the, on the spindle (4), mounted stop item (19), but not allow that the stop surface (12) on the sleeve (6) is led back past the stop item (19) on the spindle, such that the sleeve (6) is prevented from being screwed too high up. Among these, the stop item (19) can have a design as a snap hook, a Seeger H-ring or a Seeger Springring RW DIN 7993.

In yet another embodiment, the stop item (19) can be mounted in the track (20) on the spindle (4) through a hole in the side of the sleeve (6) when the sleeve (6) is screwed down on the spindle (4). The hole in the sleeve (6) will after mounting of the stop item (19) have to be closed in a way, which meets the hygiene and authority related requirements.

In FIGS. 2, 3 and 4 is with (14) shown a lower sealing item, which is mounted on the sleeve (6) in the area at the first end surface (15). This lower sealing item (14) seals between the sleeve (6) and the spindle's (4) cylindrical surface (10) below the thread (5) on the spindle (4) and thereby ensures that filth and bacteria can not enter into the spindle's (4) thread (5) in this area.

In FIGS. 2 and 4 (8) therein is shown an internal cylindrical surface on the sleeve (6). This cylindrical surface (8) has a circumference, which is larger than the circumference on the spindle's (4) thread (5), such that the cylindrical surface (8) can be led up around the thread (5) on the spindle (4) when the sleeve (6) with the internal thread (7) is screwed up on the spindle's thread (5).

The cylindrical surface (8) is placed between the thread (7) on the sleeve (6) and the first end surface (15).

The surface (8) is in a preferred embodiment cylindrical, but can in another embodiment have a non cylindrical cross section in a plane perpendicular to the center axis (24), including polygonal.

In FIGS. 2 and 4 (9) therein indicates a second inner surface on the sleeve's (6) shielding part (27), which is placed between the spindle's (4) external cylindrical surface (10) and the inner cylindrical surface (8) on the sleeve (6). The surface (9) is in a preferred embodiment cylindrical, but can in another embodiment have a non-cylindrical cross-section in a plane perpendicular to the center axis (24), including polygonal. In another embodiment, where the sleeve's (6) insert part (26) is placed at the lower end surface (15) on the sleeve (6), this inner surface (9) can be constituted by a surface on the sleeve's (6) insert part (26).

In FIGS. 2 and 4, (12) therein indicates a stop surface on the sleeve's (6) shielding part (27) which is limited by the inner cylindrical surface (8) and the second surface (9). The stop surface (12) is here shown as a disc-shaped surface, between the two surfaces (8, 9).

This limitation of the stop surface (12) ensures that the stop surface (12) will form contact with a surface/surfaces on the stop item (19) and prevents the sleeve (6) from being screwed too high up.

The stop surface (12) is in a preferred embodiment plane and proceeding perpendicular to the spindle's (4) center axis (24), but is not limited to this orientation and shape, including it can in another embodiment be inclined in relation to the center axis (24) or consist of several separate surfaces.

The stop surface (12) on the sleeve (6) is also in a preferred embodiment placed so close to the first end surface (15) on the sleeve (6) as possible, such that the distance between this stop surface (12) and the spindle's (4) stop surface (11) when screwing on of the sleeve (6) is started, is as large as possible, such that the sleeve (6) can be screwed as far up as possible up over the thread (5) on the spindle (4).

In another embodiment, where the sleeve's (6) insert part (26) is placed at the lower end surface (15) on the sleeve (6), this stop surface (12) can consist of a surface on the sleeve's (6) insert part (26).

In FIGS. 2 and 4 (17) therein indicates a ledge on the sleeve's (6) shielding part (27), which is limited by the internal cylindrical surface (8) and the other internal surface (9) on the sleeve (6). This ledge has an inner side, proceeding preferably perpendicular to the spindle's (4) center axis (24), which constitutes the stop surface (12).

This ledge (17), in a preferred embodiment, also constitutes support for the lower sealing item (14).

In another embodiment, this ledge (17) on the sleeve (6), which with its inner side constitutes the stop surface (12) can be placed in a greater distance from the first end surface (15) and thus the sleeve's (6) possibility of movement upwards is reduced since the distance between the stop surface (12) on the sleeve (6) and the stop surface (11) on the spindle (4) are reduced. The support of the lower sealing item (14) will thus have to consist of another element on the sleeve (6).

In another embodiment, where the sleeve's (6) insert part (26) is positioned at the lower end surface (15) on the sleeve (6), this ledge (17) can be placed on the sleeve's (6) insert part (26).

In FIG. 3 (29) therein indicates a cut marking, where the sectional view is shown in FIG. 4.

Figure 5:
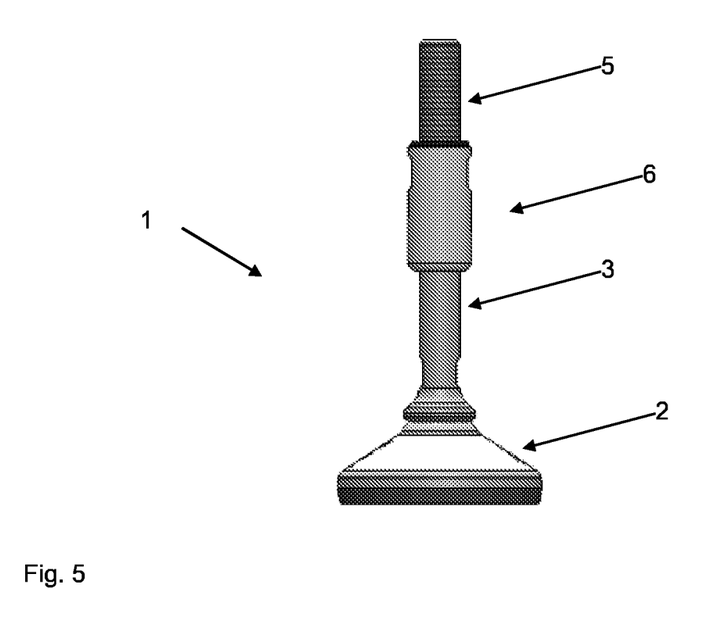
FIG. 5 shows an assembled levelling device

In FIG. 5 (1) therein indicates an assembled levelling device, which includes a top part (3) and a lower part (2). On the figure, the sleeve (6) is turned a distance up on the spindle's (4) thread (5)

In a levelling device (1), according to the invention, it is not possible to expose the whole or parts of the lowermost of the spindle's (4) thread (5) by a mistake, when the sleeve (6) is screwed up in order to seal against the item, which is to be supported, since there by adding a stop surface (12) in the sleeve (6) and a stop item (19) in the spindle (4) is provided an upper stop for the sleeve's (6) movement. Thereby, the expected future requirements from authorities can be met and the authority approvals, including from USDA, can be achieved.

By adapting the length of the sleeve (6) in relation to the spindle's (4) thread (5) such that the spindle's (4) thread (5) is longer than the sleeve (6) it can be ensured that there is always sufficient free thread (5) at the top of the spindle (4) to fix an item, such as a machine, even though the sleeve (6) is screwed fully up.

In another embodiment of the sleeve (6), the thread (7) on the sleeve (6) can continue to the stop surface (12) such that the internal cylindrical surface (8) does not exist.

It is a part of the invention that the described levelling device (1) is used in locations with high requirements for hygiene such as locations for processing of foodstuffs or manufacturing of medicine and in areas where there is risk of earthquake.

The invention claimed is:

1. A levelling device for levelling and support of an item, comprising:
    a top part for fastening in the item and having a spindle and a sleeve mounted on the spindle, and
    a lower part separable from the top part for contact against a surface,
    wherein the spindle comprises a thread, a lower end surface, an external cylindrical surface in the area between the thread and the lower end surface, a center axis for the thread, the lower end surface and the sleeve,
    wherein the sleeve includes a first end surface closest to the lower part, an upper end surface on the opposite end of the sleeve and an internal thread in an area at the upper end surface and designed to engage with the thread on the spindle to control axial movement of the sleeve with respect to the spindle,
    wherein the sleeve further comprises an internal cylindrical surface between the internal thread and the first end surface having a larger circumference than the external circumference on the thread of the spindle and an internal stop surface positioned perpendicular relative to the center axis and positioned between the internal thread and the first end surface on the sleeve,
    wherein the internal stop surface extends radially inwardly from the internal cylindrical surface and is limited by an inner surface positioned between the external cylindrical surface of the spindle and the internal cylindrical surface on the sleeve,
    wherein the spindle further comprises a track which extends perpendicular to the center axis, proceeds all the way around the spindle, and is placed where the thread and the cylindrical surface on the spindle meet,
    wherein the spindle further comprises a stop item mounted in the track on the spindle and extending outwardly over the inner surface to contact the internal stop surface of the sleeve,
    wherein the stop surface is axially movable along the external cylindrical surface below the stop item by rotating the internal thread with respect to the thread as the sleeve is turned, and
    wherein the stop item prevents axial movement of the stop surface beyond the cylindrical surface when the sleeve is moved along the center axis in the direction of the thread.

2. The levelling device according to claim 1, wherein the sleeve further comprises an insert part and a shielding part having cylindrical surfaces on the sleeve, wherein the insert part comprises an external surface configured to form contact with a first internal surface of the shielding part, and wherein the insert part further comprises an end surface configured to form contact with a second internal surface of the shielding part.

3. The levelling device according to claim 2, wherein the insert part is comprised of a metallic or polymeric material.

4. The levelling device according to claim 2, wherein the shielding part is comprised of a metallic or polymeric material.

5. The levelling device according to claim 2, wherein the insert part is comprised of stainless steel.

6. The levelling device according to claim 2, wherein the shielding part is comprised of stainless steel.

7. The levelling device according to claim 1, wherein the sleeve further comprises an insert part and a shielding part, which insert part and shielding part comprise at least one item selected from the list comprising thread, glue line, weld or press fit joint for providing a mechanical locking between the insert part and the shielding part.

8. The levelling device according to claim 1, wherein the stop item is a locking ring.

9. The levelling device according to claim 1, wherein that the stop surface on the sleeve is provided by a ledge placed in the area where the first end surface on the sleeve is found.

10. The levelling device according to claim 9, wherein the ledge is configured to support a lower sealing item, wherein the lower sealing item is configured to seal between the sleeve and the cylindrical surface of the spindle.

11. The levelling device according to claim 1, wherein there in the area at the lower end surface on the spindle is found a surface with a larger circumference in a plane perpendicular to the center axis of the spindle than the cylindrical surface on the spindle.

12. The levelling device according to claim 1, wherein the stop item includes a stop surface configured to be fixed positioned in relation to the spindle.

13. The levelling device according to claim 12, wherein the stop surface comprises the surface on the stop item, which faces in direction towards the lower surface and which is not engaged with the track.

14. The levelling device according to claim 1, wherein the leveling device is configured for use in locations with high requirements for hygiene such as locations for processing of foodstuffs or manufacturing of medicine and for supporting a machine.

15. The levelling device according to claim 1, wherein the leveling device is configured for use in supporting a machine placed in areas with risk of earthquake.

\* \* \* \* \*